United States Patent
Smith et al.

[19]

[11] Patent Number: 6,044,197
[45] Date of Patent: Mar. 28, 2000

[54] RECORDING OF TIME CODE IN A DATABASE

[75] Inventors: David Smith; Kevin D. Windrem, both of Grass Valley, Calif.

[73] Assignee: Grass Valley (U.S.) Inc., Nevada, Calif.

[21] Appl. No.: 08/209,283

[22] Filed: Mar. 14, 1994

[51] Int. Cl.$^7$ .............................. H04N 5/93; G11B 27/00
[52] U.S. Cl. ................................................................. 386/55
[58] Field of Search ..................................... 358/335, 311, 358/337, 313, 320; 360/13, 14.2, 14.3, 48, 49; 386/11, 4, 5, 12, 16, 52, 55, 59, 61

[56] References Cited

U.S. PATENT DOCUMENTS

| | | | |
|---|---|---|---|
| 3,721,757 | 3/1973 | Ettlinger | 360/14.3 |
| 4,835,626 | 5/1989 | Wilkinson | 360/14.3 |
| 4,979,050 | 12/1990 | Westland et al. | 360/14.1 |
| 5,218,672 | 6/1993 | Morgan et al. | 395/162 |

OTHER PUBLICATIONS

"American National Standard for Television—Time and Control Code—Video and Audio Tape for 525–Line/60–Field Systems" ANSI/SMPTE 12M–1986 Revision and Redesignation of ANSI V98.12M–1981.

*Primary Examiner*—Douglas W. Olms
*Assistant Examiner*—David R Vincent
*Attorney, Agent, or Firm*—Francis I. Gray

[57] ABSTRACT

A method of recording time code in a database is disclosed which makes it easy to search for video segments on a target medium while making the original source time code available on playback. As a video segment from a source medium is recorded on the target medium the time code from the first frame of the video segment is extracted and held. The number of frames of the video segment are counted to determine a duration, and at the conclusion of the video segment the extracted time code together with the duration and a location code indicating where on the target medium the video segment is stored are formed into a data structure that is stored in a break table in the database as a "break" entry. The break table is sorted, optimized to eliminate any break entry overlaps, and updated after each new break entry.

1 Claim, 2 Drawing Sheets

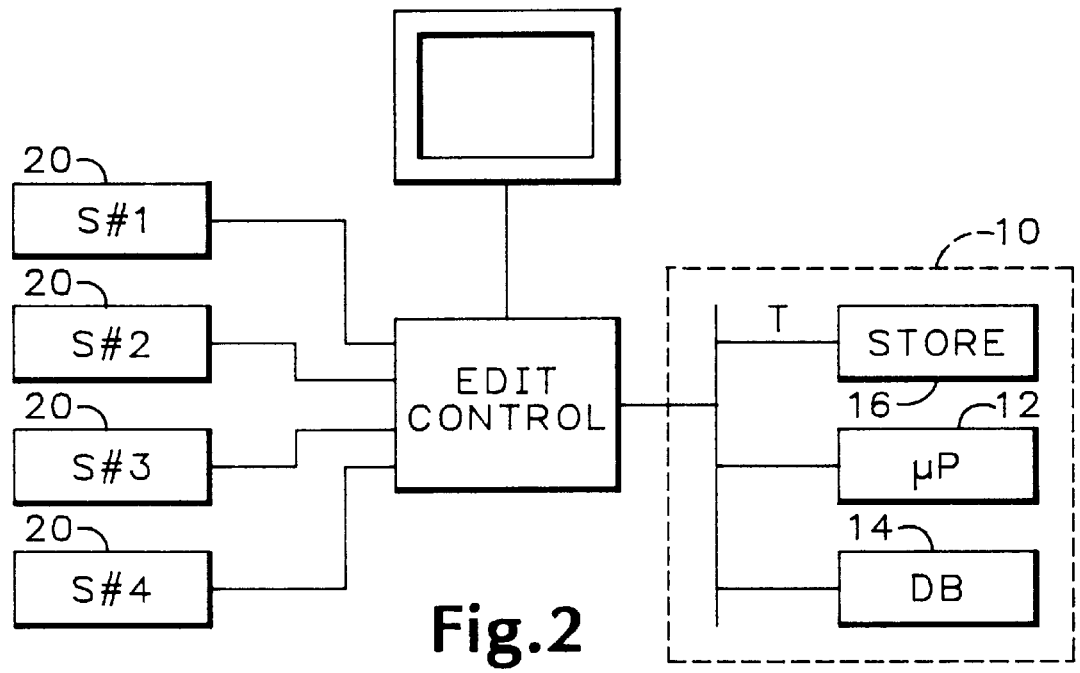
Fig.1
Fig.2
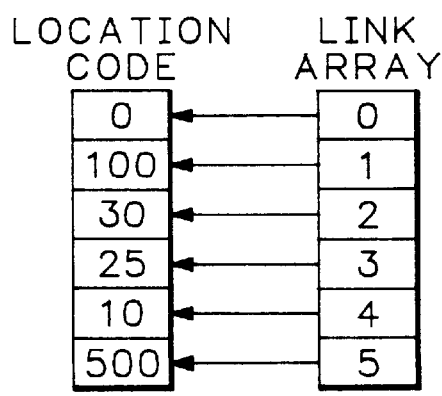
Fig.3A
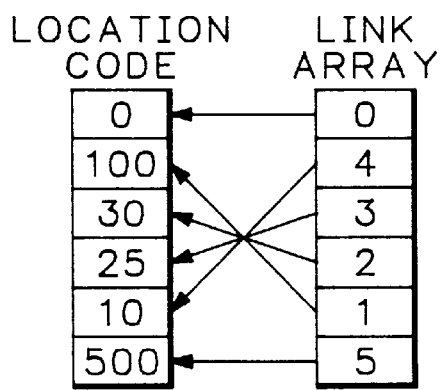
Fig.3B

RECORDING OF TIME CODE IN A DATABASE

BACKGROUND OF THE INVENTION

The present invention relates to video editing, and more particularly to the recording of time code in a database for manipulation during video editing.

Time code is a sequential number system representing time which is recorded onto video tape to give each frame of a video image a unique number. A description of time code is contained in ANSI/SMPTE specification 12M-1986. Time code is used within the television industry to identify a unique location of a segment of video. Editors, or edit controllers, which are computers used to edit video and audio, use the time code to uniquely identify the segment of video on video tape recorders (VTRs) that they control. There are two types of time code: Longitudinal Time Code (LTC) and Vertical Interval Time Code (VITC). LTC is time code that is recorded on a longitudinal track of a VTR, while VITC is time code that is a part of the video signal. There are also two methods of reporting time code: drop frame time code and non-drop frame time code. Drop frame time code is used when certain frames are dropped to resolve the difference between real time and color time. Real time is the time needed to transmit a black and white video signal (30 frames per second), and color time is the time needed to transmit a color video signal (29.97 frames per second). Non-drop frame time code is used in all other cases.

For edit controllers to search for a given segment of video, it is assumed that the time code is linear, i.e., time code is present and there is one frame difference in the time code between adjacent frames of video. During the video editing process segments of video are pulled together from different sources. These sources may have different time codes. As various sources are recorded to create a new video segment, the time code recorded with the video is non-linear. The video frames at the boundary between the sources do not have sequential time code. With non-linear time code editors are not able to search for video via time code because time code becomes ambiguous. To overcome ambiguity on the target media, the tape in the record VTR is striped, i.e., the color black and linear time code are recorded onto a blank tape so that it can be used with the edit controller, and the source time code is not recorded on the target media. This has the disadvantage of losing the original source material's time code.

SUMMARY OF THE INVENTION

Accordingly the present invention provides for recording of time code into a database using a data structure that includes a time code extracted from the first frame of a video segment being recorded converted to fields from a reference time, a duration in fields of the video segment, and a location code representing the starting location in the video recorder storage area for the video segment. The data structure represents a "break" in a linear time code sequence, and is added to the end of a break table in the database. The break table is sorted into location code order by sorting an associated break link table. The break table is then optimized to eliminate overlap between entries, and resorted if any new break entries are created as a result. Finally the break table is updated in the database.

The objects, advantages and other novel features of the present invention are apparent from the following detailed description when read in conjunction with the appended claim and attached drawing.

BRIEF DESCRIPTION OF THE DRAWING

FIG. 1 is an illustration of a data structure for recording time code in a database according to the present invention.

FIG. 2 is a block diagram of an editing system that records time code in a database according to the present invention.

FIGS. 3A and 3B illustrate a sorting algorithm for a break table that records time code according to the present invention.

DESCRIPTION OF THE PREFERRED EMBODIMENT

Figure 4A:
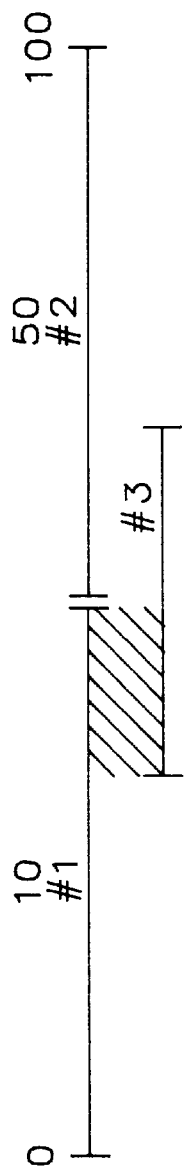
FIGS. 4A, 4B and 4C illustrate optimization of overlapping entries in a break table that records time code according to the present invention.

Since time code is linear over a segment of video from a source media, it is not necessary to record the time code along with the video. Therefore a data structure, as shown in FIG. 1, containing starting LTC and VITC time code values, duration and position of the video segment on a target media in any specified order is used to represent the time code. A table of these data structures, which represent "breaks" in the linear time code over a length of video on the target media, is maintained in a database. The original time code is regenerated from these data structures in the database during playback. For a search operation the database is scanned to find an entry which contains the desired time code by comparing against the range of time codes defined by the start time code and duration from the data structures.

Referring now to FIG. 2 a video recorder 10, whether a tape recorder or a disk recorder, has a microprocessor 12 that includes a database 14. As a video segment from a source media 20 is written onto the video recorder storage medium 16 the data structure for entry into the database 14 is created by the microprocessor 12. The microprocessor 12 extracts the starting LTC and VITC time codes from the first frame of the video segment, notes the location in the video recorder storage area 16 where the segment is being written, and counts the number of frames in the segment. At the end of writing the segment the microprocessor 12 enters the resulting data structure into the database 14. The microprocessor 12 converts the LTC and VITC time codes to fields with zero representing midnight. Time code is converted to its equivalent number of fields to simplify the manipulation of the time code data structures in the database 14. Encoded bits within the time code indicate whether the time code is in drop frame or non-drop frame format.

Drop frame time code resolves the difference between real time and color time, as indicated above. This results in a non-linear conversion based on the color time frame rate of 29.97 frames per second. Multiplying the frame rate by 100 simplifies calculations, with the result divided by 100 to obtain the actual value. The number of drop frames in any one hour is equal to 107892. To correct for color time two frames are dropped every minute except minutes that are divisible by 10, which are referred to as non-drop minutes. Each of the six non-drop minutes are grouped together with nine drop minutes and referred to as a non-drop group. A non-drop group thus includes the nine minutes where two frames are dropped and the one minute where no frames are dropped.

Time code is normally recorded by storing the time code value associated with each video frame on the video recorder storage area 18 over the entire length of the video segment. However, since the time code is linear over a given segment, the time code from the first frame of the video segment instead is recorded in the database 14 together with the position (location code) on the target media, starting time code value and length of the video segment. Each entry in the database 14 refers to a segment of video with linear time code. Any two entries represent a break or discontinuity in the linear time code. Such discontinuities are only reported while recording. The incoming LTC and VITC values are read from a time code reader in the video recorder 10 and converted to fields. A discontinuity in the time code is detected by comparing the expected LTC and VITC field counts with the actual LTC and VITC field counts. The expected field counts are generated by adding one field to each of the previous LTC and VITC field counts synchronized with video sync. A time code discontinuity may appear in LTC, VITC or both. When the discontinuity is detected, the data structure of FIG. 1, commonly called a "break", is logged.

To properly define a break the record in and out points are needed. This means that two break structures are needed to completely define one break in linear time code. This is true because the break is reported when it is detected and it does not know the length until a record out point is detected. As a result received break structures are placed into a hold area of the microprocessor 12 until two break data structures have been reported. When two break structures have been received, the first structure's end field is set equal to the second structure's start field minus one field (no overlap). If the second structure no longer has tracks in the record, it is discarded. In this case the second structure becomes the record out point for the first structure and is no longer needed. If the second structure still has a track in record, it is held until another structure indicating the record out point is received. The first structure received is stored at the end of a break table in the database 14 and flagged as a new break entry. Next the break table is sorted on location code so that the breaks in the time code appear in a linear order. Gaps in the location code stored in the break table are not allowed.

The break table itself cannot be easily sorted, so the break table is copied to a work area. When the break table is copied, two arrays are created and initialized. The first array is a break link array, and the second array is a break flag array. The break link array contains indexes, or links, into the break table. The break flag array contains flags that indicate whether a break is old or new. This is important when breaks overlap each other.

A sorting algorithm for the break table is based on a modified bubble sort. This algorithm is the most efficient when the table is mostly sorted. Since the break table is sorted after receiving each new break, it may be considered mostly sorted. The modifications to the bubble sort algorithm include: an added flag that is used to break from the bubble sort after one pass if the table is already sorted, and the use of pointers or links instead of the indexes into the tables.

The break table itself is sorted based on location code contained within each break entry, not the time code. Since the location codes on the target media are unique, the table may be sorted by location code in linear ascending order. This is not true for time code. Because the time code may come from many different source media, there is a possibility for the time codes to be the same in two or more segments. This results in several entries in the break table with the same time code but with different location codes.

The actual sorting of the break table is done with the link array, as illustrated in FIGS. 3A and 3B. The bubble sort algorithm uses the link array to compare each adjacent break entry's location code. If the break entry pointed to by the link entry plus one is greater than the one pointed to by the link entry, the link entries are swapped. Thus only the links, or pointers, are sorted. This avoids copying the data from one entry to another. After all the pointers are sorted so that the location code is in ascending order starting with zero, the break table is optimized. Whatever is done to the break link array is also done to the same entries in the break flags array. The flag that marks the entry that is a new break must follow the pointer to that break.

Optimizing the break table corrects for any break entry overlaps. Break entry overlap occurs when one break entry overlaps the start field or end field of another break entry. There are five ways breaks may overlap: start field overlap, end field overlap, entry contained, entry deleted and no entry overlap. Only new break entries may overlap old break entries. It is important to know which break entry is new to determine which segment of video is overwritten by the new entry. If the overlap is not handled when the new break entry is created, it cannot be determined which segment of video is overwritten.

During the process of optimizing the break table, a check is made to determine if two adjacent break entries are one continuous entry. Contiguous entries are defined as entries where the first entry Is starting time code plus the duration of the segment is equal to the starting time code of the second entry minus one. If the two entries are contiguous, they are merged into one entry and the other entry is deleted. Both the LTC and VITC values must be contiguous. A single break entry may represent discontinuities in LTC, VITC or both.

The actual deletion of break entries occurs by adjusting the start field and end fields of adjacent break entries to include the fields that are represented by the break entry to be deleted. The starting LTC and/or VITC values also are adjusted to include the time codes represented in the deleted break entry. The optimized break table is linear and does not have any holes or overlaps in location code. The break table optimization algorithm uses the break link array to index into the break table. The optimization algorithm disregards all erased entries.

"No entry overlap" is the default state of most entries in the break table. This occurs because the table is sorted and optimized after receiving each new break entry. Therefore at any given time there is only one new entry in the break table.

A break entry is referred to as in a state of "end field overlap" (FIG. 4A) when the new break entry has a start field which is greater than an old break entry's start field and less than its end field. At the same time the new break entry's end field is greater than the old break entry's end field so that the new break entry overlaps the end field of the old break entry. For example if both the LTC and VITC tracks are in record for the new break entry, then the old break entry's end field is adjusted to the new break entry's start field minus one. The new break entry thus overwrites a portion of the old break entry. If only one of the LTC and VITC tracks is in record, another new break is created that contains the track in record from the new break entry merged with the track from the old break entry that is not overwritten. The old break entry's end field is adjusted to the new break entry Is start field minus one and the new break entry's start field is adjusted to the created break's end field plus one. The created break is stored at the end of the break table and the table is sorted before continuing.

Figure 4B:
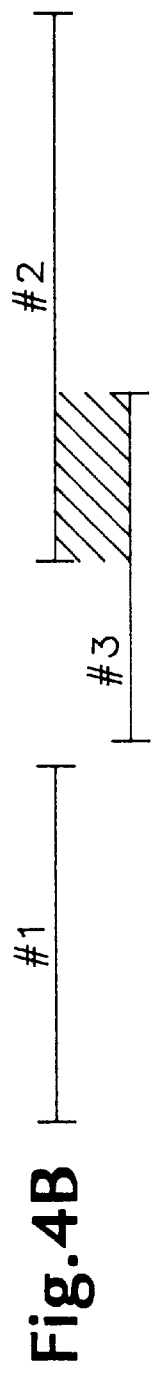
Figure 4C:
Figure 5A:
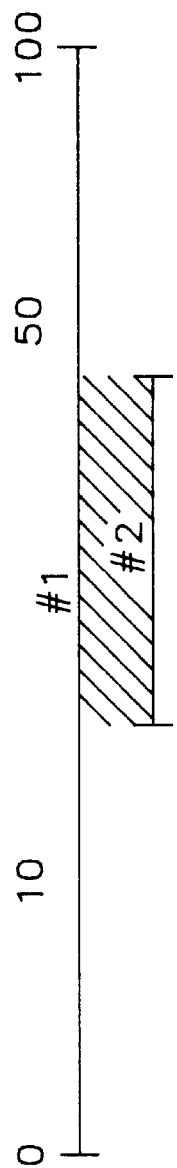
FIGS. 5A and 5B illustrate optimization of a contained entry in a break table that records time code according to the present invention.
Figure 5B:

A break entry is referred to as in a state of "start field overlap" (FIG. 4B) when the new break entry has a start field less than the old break entry's start field, and an end field that is greater than the old break entry's start field but less than its end field, so that the new break entry overlaps the start field of the old break entry. For example if both the LTC and VITC tracks are in record in the new break entry, then the old break entry's start field is adjusted to the new break entry's end field plus one. The new break entry overwrites a portion of the old break entry. If only one of the LTC and VITC tracks is in record, another break is created that contains the track in record from the new break entry merged with the break from the old break entry that is not overwritten. The new break entry's end field is adjusted to the old break entry's start field minus one, and the old break entry's start field is adjusted to the created break entry's end field plus one. The created break is stored at the end of the break table and the table is sorted before continuing.

A break entry is referred to as in a state of "entry contained" when the new break entry overlaps a portion of only one old break entry. This occurs when a new, smaller segment is recorded over a larger segment. For example when a database is created, it has one large segment that spans the entire length of the target media. The first time LTC or VITC is recorded, a break entry is generated that is smaller than the one created with the database, unless the entire target media is recorded with both the LTC and VITC tracks selected. The first break in time code recorded divides the original break entry into two breaks, with the new break entry occupying the space in between. When this occurs a new break entry is created at the end of the break table. The created break entry represents the second portion of the original break entry after it is divided.

A break entry is referred to as in the state of "entry deleted" when a new break entry completely overlaps an old break entry. When this occurs the new break entry replaces the old break entry and the old break entry's pointer in the break link table is erased.

After the break table is optimized, the break table is sorted to reflect any additions or deletions of breaks to the table resulting from the optimization algorithm. Also the flag in the break flags table which indicates a new entry is changed to an old entry. The break table is then updated and saved. The method of updating the break table uses the break link flags to copy a break entry into the old break table, skipping over entries that are deleted.

Thus the present invention provides for recording of time code into a database by extracting time code from the first frame of a segment being recorded onto a target media from a source media, counting the number of frames in the segment, storing the time code, duration and start location in the target media in a break table in the database, and sorting, optimizing and updating the break table after each segment is recorded.

What is claimed is:

1. A method of recording time code on a video recorder having a target medium and a database comprising the steps of:

extracting the time code from a first frame of a video segment being recorded from a source medium to the target medium;

counting the number of frames in the video segment while the video segment is being recorded on the target medium to determine a duration for the video segment;

building a data structure once the video segment is recorded on the target medium which includes the time code extracted from the first frame of the video segment, the duration for the video segment and a start location on the target medium where the video segment is recorded;

storing the data structure in a break table in the database as a break entry; and sorting, optimizing and updating the break table after recording each video segment on the target medium to correlate the break entry for the video segment with prior break entries in the break table.

* * * * *